United States Patent
Satyanarayana

(10) Patent No.: US 11,973,642 B1
(45) Date of Patent: Apr. 30, 2024

(54) AUTOMATIC NETWORK DEVICE CONFIGURATION

(71) Applicant: Hewlett Packard Enterprise Development LP, Spring, TX (US)

(72) Inventor: Shekhar Satyanarayana, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/336,528

(22) Filed: Jun. 16, 2023

(51) Int. Cl.
*H04L 41/0803* (2022.01)
*H04L 12/46* (2006.01)

(52) U.S. Cl.
CPC ...... *H04L 41/0803* (2013.01); *H04L 12/4641* (2013.01)

(58) Field of Classification Search
CPC .............. H04L 41/0803; H04L 12/4641
See application file for complete search history.

(56) References Cited

PUBLICATIONS

Fruehe, "Overlay Network," TechTarget, https://www.techtarget.com/searchnetworking/definition/overlay-network, updated Jun. 2022, (accessed May 26, 2023), 5 pages.

"What is an aggregate switch?", FS community, https://community.fs.com/blog/what-is-an-aggregate-switch.html, updated Jan. 20, 2023, (accessed May 26, 2023), 4 pages.

"Group Persona." Aruba Networks, https://www.arubanetworks.com/techdocs/central/latest/content/nms/groups/group-persona.htm (accessed May 26, 2023), 1 page.

"Link Layer Discovery Protocol (LLDP)." WhatsUp Gold, https://www.whatsupgold.com/network-discovery/link-layer-discovery-protocol-lldp (accessed May 26, 2023), 4 pages.

*Primary Examiner* — Blake J Rubin
(74) *Attorney, Agent, or Firm* — Slater Matsil, LLP

(57) ABSTRACT

In an example implementation consistent with the features disclosed herein, network devices of a physical network are bucketized for automatic configuration based on statistical analysis of the quantity of network links for the network devices. The quantity of network links for each of the network devices is identified. A bucketing factor for the network devices is computed. The bucketing factor equals a sum of a mean and a confidence interval value for the quantity of network links for the network devices. A persona for a provisioned network device is recommend based on the bucketing factor. The persona is assigned to the provisioned network device. A network device configuration is applied to the provisioned network device based on the persona assigned to the provisioned network device. A virtual network may be created on the physical network.

20 Claims, 5 Drawing Sheets

AUTOMATIC NETWORK DEVICE CONFIGURATION

BACKGROUND

Overlay networking allows the creation of a virtual network that runs on a physical network. It enables abstraction of the underlying network devices, providing flexibility, scalability, and isolation in a network. In overlay networking, a virtual network is created using software-defined networking techniques. Network packets may traverse the physical network while appearing as if they belong to a virtual network.

In a private cloud environment, overlay networking may be used to enable network virtualization and provide network connectivity between cloud components (e.g., virtual machines, containers, etc.). For example, cloud components may be assigned to a particular virtual network so that they may communicate even if they are distributed across different physical host servers or data centers. Virtual networks may be logically segmented and isolated from each other and from the underlying physical network. Virtual networks can be created, modified, or removed as needed by the private cloud environment.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
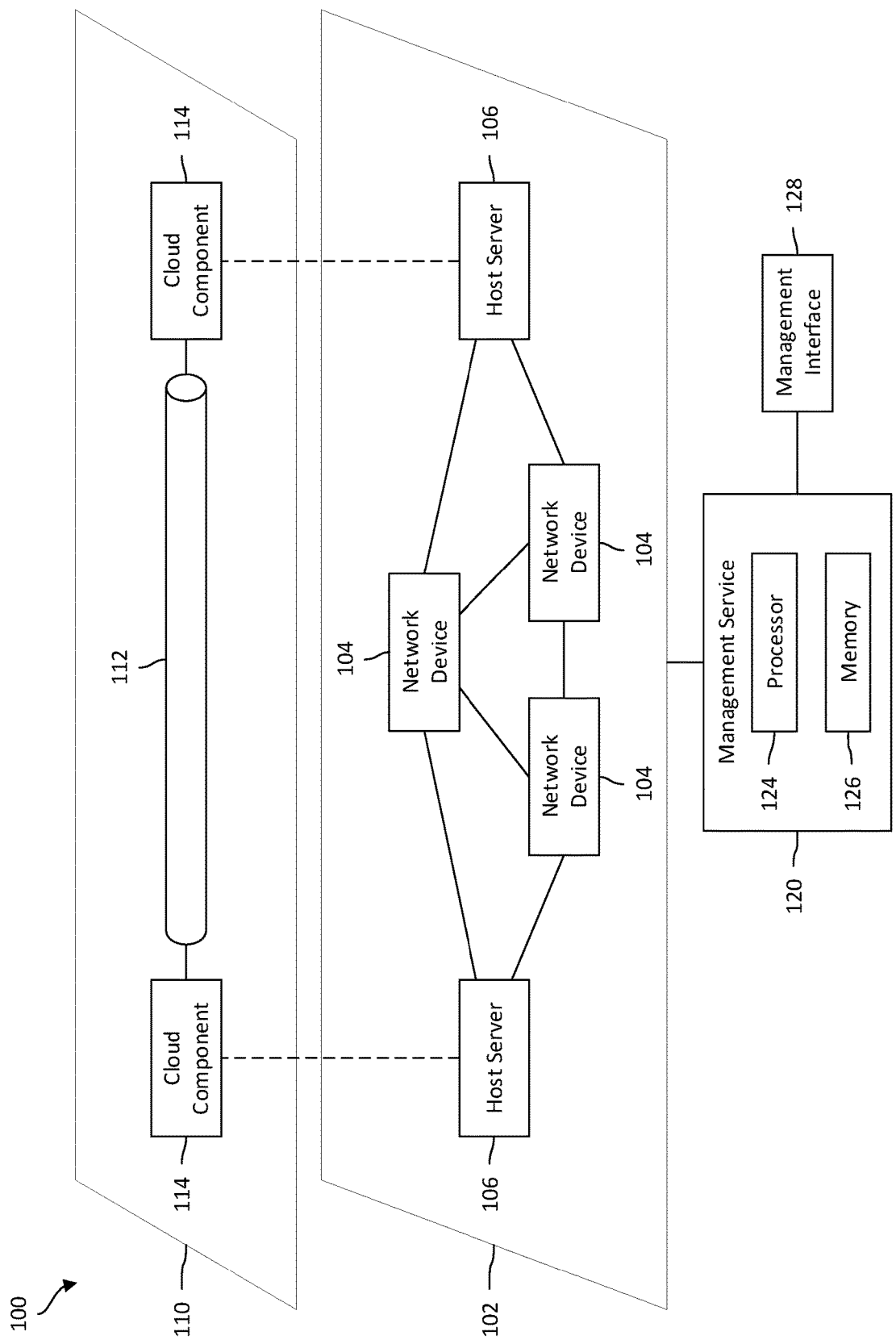
FIG. 1 is a block diagram of a private cloud environment, according to some implementations.

The following disclosure provides many different examples for implementing different features. Specific examples of components and arrangements are described below to simplify the present disclosure. These are, of course, merely examples and are not intended to be limiting.

A component of cloud orchestration is the orchestration of a virtual network using overlay networking. During orchestration of a virtual network, the underlying physical network is configured before a virtual network is created. For example, network device configurations may be pushed to the network devices of a physical network, in preparation for the creation of a virtual network.

A network device, such as a switch, may be assigned a persona based on the role of the network device in the physical network. For example, in a data center (DC) network topology having a spine-leaf architecture, a switch may be an upper-tier switch (e.g., a spine switch) or a lower-tier switch (e.g., a leaf switch). Similarly, in a campus network topology having a layered architecture, a switch may be an upper-tier switch (e.g., a core switch or an aggregator switch) or a lower-tier switch (e.g., an access switch). Network device configurations are pushed to the network devices based on the personas assigned to the network devices. To aid with cloud orchestration, a persona may be automatically recommended for assignment to a network device. A network administrator may then agree or disagree with the recommended persona. Automating the recommendation and assignment of persona to a network device may increase the efficiency of network administration, provided the recommendations are quick and accurate.

In an example implementation, personas for network devices of a physical network are recommended based on the quantity of network links for each of the network devices. A network link is a physical connection between network devices, which may be discovered via Link Layer Discovery Protocol (LLDP). Each network device is bucketized based on its quantity of links to neighboring network devices.

Specifically, a bucketing factor can be computed via statistical analysis. The bucketing factor equals the sum of a mean and a confidence interval value for the quantity of network links for the network devices. The network devices can then be grouped by comparing their quantity of network links to the bucketing factor.

The network devices in a lower-tier group may each have a quantity of network links that is less than the bucketing factor, while the network devices in an upper-tier group may each have a quantity of network links that is greater than or equal to the bucketing factor. A lower-tier persona is then recommended for the network devices in the lower-tier group, while an upper-tier persona is recommended for the network devices in the upper-tier group. For example, a spine switch persona may be recommended for the network devices in the upper-tier group, while a leaf switch persona may be recommended for the network devices in the lower-tier group. The recommendation may be presented to the network administrator.

Upon the network administrator's agreement with the recommendation, a lower-tier network device configuration (corresponding to the lower-tier persona) may be applied to the network devices in the lower-tier group, while an upper-tier network device configuration (corresponding to the upper-tier persona) may be applied to the network devices in the upper-tier group. Continuing the previous example, a spine switch configuration may be applied to the network devices in the upper-tier group, while a leaf switch configuration may be applied to the network devices in the lower-tier group. Bucketizing the network devices based on statistical analysis of the quantity of network links for each of the network devices may be quicker than other bucketization techniques (e.g., network topology discovery) while still maintaining a desired degree of accuracy. Additionally, bucketizing the network devices based on statistical analysis of the quantity of network links may be more scalable than other bucketization techniques (e.g., using a predetermined bucketing factor) and may better adapt to networks having network devices with a diverse quantity of network links. The efficiency of network administration and orchestration may thus be increased.

FIG. 1 is a block diagram of a private cloud environment 100, according to some implementations. The private cloud environment 100 is a system that includes a physical network 102. Overlay networking may be used to orchestrate the private cloud environment 100 so that a virtual network 110 runs on the physical network 102.

The physical network 102 includes multiple network devices 104. The network devices 104 may be controllers, access points, switches, routers, or the like. Additionally, the physical network 102 includes host servers 106. The host servers 106 may be bare metal machines that are adapted to host cloud components 114 (e.g., virtual machines, containers, etc.). The network devices 104 form a transport network that provides connectivity and routing between the host servers 106. At least some of the network devices 104 and the host servers 106 may be located in an on-premises data center, but the physical network 102 may span across multiple locations. The physical network 102 may be a Layer 2 network.

The virtual network 110 is established on the physical network 102 using an encapsulation protocol. An encapsulation protocol encapsulates network traffic within a virtual tunnel 112, which is transmitted via the network devices 104. Example encapsulation protocols include Virtual Extensible LAN (VXLAN), Generic Routing Encapsulation (GRE), and the like. Encapsulation allows the virtual network 110 to operate as if it running on dedicated physical infrastructure, even though the traffic is actually transported over the physical network 102. The virtual network 110 may be used in a virtualized environment. Specifically, the cloud components 114 hosted by the host servers 106 may be connected via a virtual tunnel 112. The virtual network 110 may be a Layer 3 network.

A management service 120 is adapted to manage the private cloud environment 100. Specifically, the management service 120 may be used to create or modify the virtual network 110, such as by creating or modifying a virtual tunnel 112. Additionally, the management service 120 is used to configure the network devices 104 of the physical network 102, such as by applying network device configurations to the network devices 104 in preparation for the creation of the virtual network 110. The network devices 104 may be assigned personas, which represent the roles of the network devices 104 in the physical network 102. Network device configurations are pushed to the network devices 104 based on their assigned personas, which may allow for automation of the private cloud environment 100. As subsequently described in greater detail, personas will be automatically recommended for assignment to the network devices 104 by the management service 120. Automating the recommendation and assignment of personas to the network devices 104 may increase the efficiency of network administration, and may increase the efficiency of the private cloud environment 100. The personas for the network devices 104 will be recommended based on the quantity of network links for each of the network devices 104.

The management service 120 may include any suitable components. Suitable components include a processor, an application-specific integrated circuit, a microcontroller, memory, and the like. The management service 120 may be a physical device, e.g., a computer. For example, the management service 120 may include a processor 124 and a memory 126. The memory 126 may be a non-transitory computer readable medium that stores programming for execution by the processor 124. One or more modules within the management service 120 may be partially or wholly embodied as software and/or hardware for performing any functionality described herein. For example, they may be embodied as software, which is deployed to a physical device using a suitable containerization technique.

The management service 120 may be an on-premises service or may be a cloud service. When the management service 120 is an on-premises service, it may be part of the physical network 102, such as in an on-premises data center. When the management service 120 is a cloud service, it may be part of another physical network that is different than the physical network 102. In either implementation, the management service 120 is adapted to communicate with the network devices 104.

The management service 120 receives commands from a management interface 128 and displays output with the management interface 128. The management interface 128 may be a command line interface, a graphical user interface, a web interface, or the like. The management service 120 processes the commands from the management interface 128, validates the commands, and executes logic specified by the commands. Further, the management service 120 outputs the results of commands via the management interface 128.

Figure 2:
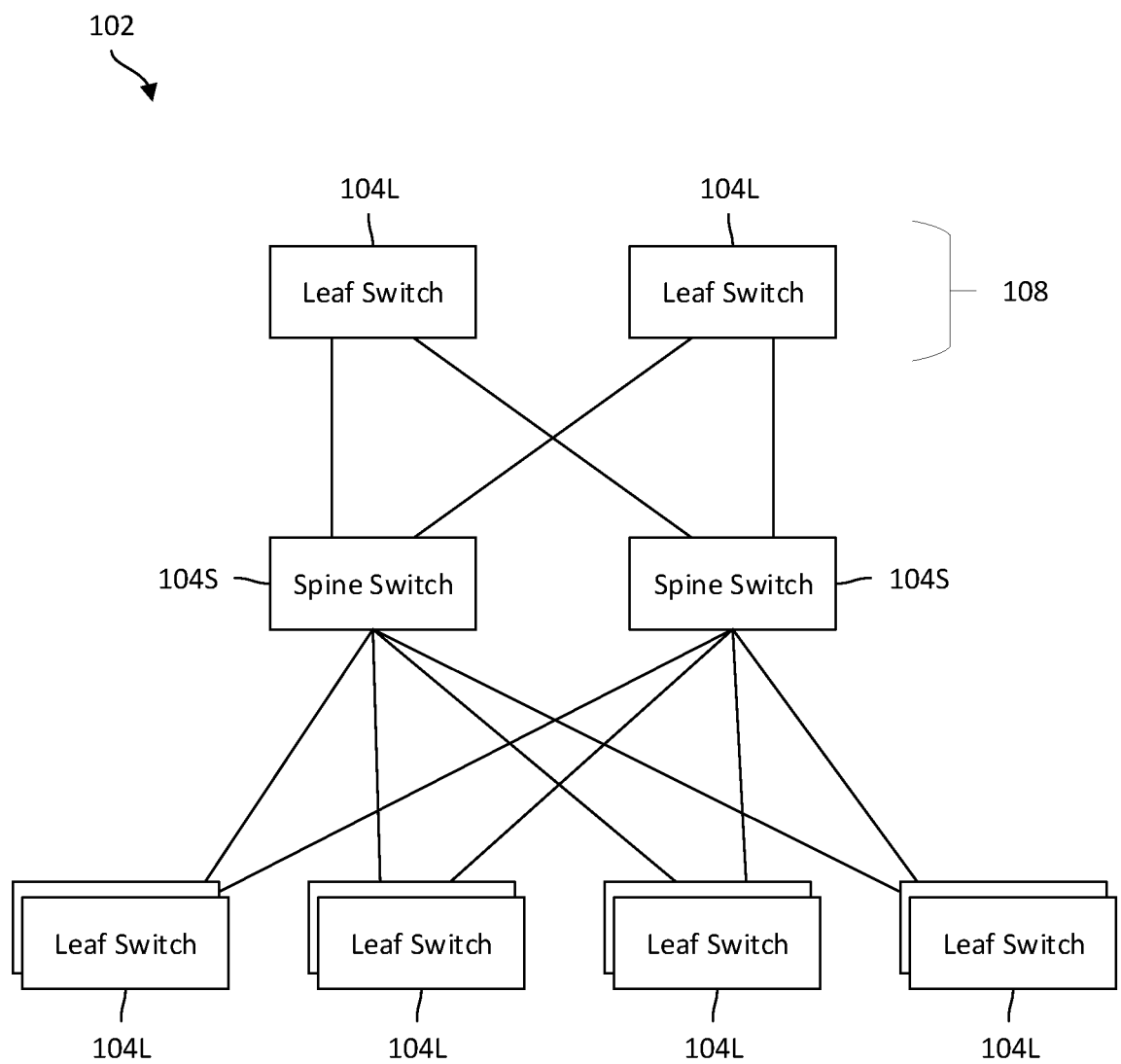
FIG. 2 is a block diagram of a physical network, according to some implementations.

FIG. 2 is a block diagram of a physical network 102, according to some implementations. Some features of the physical network 102 are omitted for illustration clarity. Specifically, only some of the network devices 104 of the physical network 102 (e.g., switches) are illustrated. In this implementation, the physical network 102 has a data center (DC) network topology with a spine-leaf architecture, where the network devices 104 include leaf switches 104L and spine switches 104S.

The leaf switches 104L are lower-tier switches, being closer to the edge of the physical network 102 than the spine switches 104S. The leaf switches 104L contain access ports that connect to servers, firewalls, load balancers, and edge routers within the physical network 102. For example, the host servers 106 (see FIG. 1) are connected to the leaf switches 104L. Each leaf switch 104L has network links to the spine switches 104S. Some of the leaf switches 104L at a border 108 of the physical network 102 are border leaf switches. Border leaf switches provide Layer 2 or Layer 3 external connectivity to external networks outside of the physical network 102. Border leaf switches may perform routing to external routers of the external networks. Although not shown in FIG. 2, a leaf switch 104L may be linked to another leaf switch 104L, such as with a virtual switching extension (VSX) link, to form pairs of the leaf switches 104L.

The spine switches 104S are upper-tier switches, being further from the edge of the physical network 102 than the leaf switches 104L. The spine switches 104S connect the leaf switches 104L together, forming a spine-leaf fabric. Thus, the spine switches 104S act as the backbone of the physical network 102. Each spine switch 104S has a network link to each of the leaf switches 104L.

The leaf switches 104L may be the same hardware as the spine switches 104S, but the leaf switches 104L may be programmed differently than the spine switches 104S. Because they have different roles in the physical network 102, the leaf switches 104L and the spine switches 104S are programmed with different network device configurations. Specifically, the leaf switches 104L are each programmed with a lower-tier network device configuration that allows them to act as lower-tier switches. Additionally, the spine switches 104S are each programmed with an upper-tier network device configuration that allows them to act as upper-tier switches. A network device configuration includes hardware settings that specify how a network device 104 should operate. For example, a network device configuration for a switch may include port settings, link aggregation group (LAG) settings, Open Shortest Path First (OSPF) settings, etc. The network device configuration for the leaf switches 104L is different than the network device configuration for the spine switches 104S, in that the network device configuration for the leaf switches 104L includes different hardware settings (e.g., port settings, LAG settings, and/or OSPF settings) than the network device configuration for the spine switches 104S.

During network administration, a persona will be automatically recommended for a network device 104 based on a predicted role of the network device 104. For example, when a network administrator is provisioning a switch (via the management service 120), the management service 120 will predict the role of the switch in the physical network 102, and based on that prediction, automatically recommend a persona for assignment to the switch. In this example, the management service 120 predicts whether a provisioned switch will act as a leaf switch 104L or a spine switch 104S and then recommends a leaf switch persona or a spine switch persona to the network administrator based on that prediction. Upon the network administrator's agreement with the persona recommendation, the management service 120 pushes a corresponding network device configuration (e.g., a leaf switch configuration or a spine switch configuration) to the switch based on the persona. Accordingly, the switch may begin operating in its desired role (e.g., as a leaf switch 104L or as a spine switch 104S).

Figure 3:
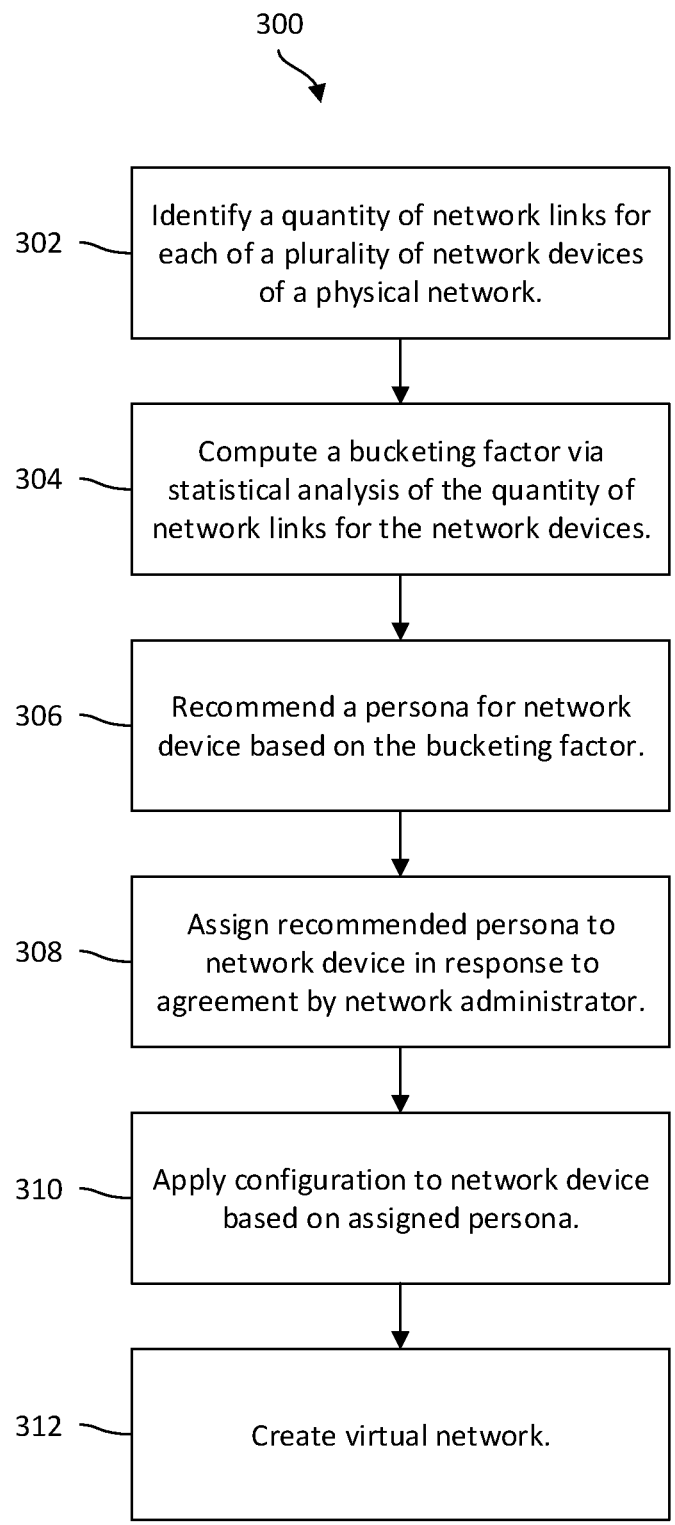
FIG. 3 is a diagram of a network device provisioning method, according to some implementations.

FIG. 3 is a diagram of a network device provisioning method 300, according to some implementations. The network device provisioning method 300 will be described in conjunction with FIGS. 1-2. The network device provisioning method 300 may be performed by the management service 120 during the provisioning of a network device 104, such as a switch.

In step 302, the management service 120 identifies a quantity of network links for each network device 104 of the network devices 104 of a physical network 102. Only the network devices 104 having a same device type as the provisioned network device 104 (e.g., switches) may be evaluated. The provisioned network device 104 may (or may not) be one of the evaluated network devices 104. A network link of a network device 104 is a connection between that network device 104 and another network device 104. The quantity of network links for each network device 104 may be discovered via a suitable network discovery protocol, such as Link Layer Discovery Protocol (LLDP). For example, the management service 120 may poll each network device 104 via LLDP to discover how many network links each network device 104 has to other network devices 104. In the example of FIG. 2 (e.g., where the leaf switches 104L are not linked to each other in pairs), there are two spine switches 104S and ten leaf switches 104L. Each leaf switch 104L has two network links (e.g., to each of the spine switches 104S). Each spine switches 104S has ten network links (e.g., to each of the leaf switches 104L). Thus, the physical network 102 includes two network devices 104 with ten network links and ten network devices 104 with two network links.

In step 304, the management service 120 computes a bucketing factor $f_B$ via statistical analysis of the quantity of network links for the network devices 104. A dynamic greedy scalable algorithm is used to compute the bucketing factor $f_B$. The bucketing factor $f_B$ is computed by calculating a confidence interval for the quantity of network links for the network devices 104, using Equations (1), (2), and (3). Specifically, the bucketing factor $f_B$ equals the sum of the mean $\bar{x}$ and a confidence interval value $s_{\bar{x}}$ for the quantity of network links for the network devices 104. The mean $\bar{x}$ of the network links is the total number of network links divided by the total number of network devices 104. The confidence interval value $s_{\bar{x}}$ is the standard deviation of the quantity of network links divided by the square root of the total number of network devices 104. Computing the bucketing factor $f_B$ dynamically (e.g., at run-time) based on the quantity of network links for the network devices 104 may be more accurate than using a hard-coded bucketing factor.

$$f_B = \bar{x} + s_{\bar{x}} \tag{1}$$

$$s_{\bar{x}} = \frac{s}{\sqrt{N}} \tag{2}$$

$$s = \sqrt{\frac{1}{N-1} \sum_{i=1}^{N} (x_i - \bar{x})^2} \tag{3}$$

In Equations (1), (2), and (3), $\bar{x}$ is the mean of the network links, $s_{\bar{x}}$ is the confidence interval value, s is the standard deviation (calculated as sample standard deviation) of the quantity of network links, N is the total number of evaluated network devices 104, and $x_i$ is the quantity of network links for a network device i. In this implementation, the confidence interval value $s_{\bar{x}}$ is based on a confidence interval of 68.3%.

Continuing the example of FIG. 2 (where the physical network 102 includes two network devices 104 with ten network links and ten network devices 104 with two network links), the mean $\bar{x}$ is 40/12 or about 3.333, and the confidence interval value $s_{\bar{x}}$ is 3.114/$\sqrt{12}$ or about 0.899. Accordingly, the bucketing factor $f_B$ is 3.333+0.899 or about 4.232.

In step 306, the management service 120 recommends a persona for the provisioned network device 104 based on the bucketing factor. The persona is recommended by predicting the role of the provisioned network device 104 in the physical network 102. The role of the provisioned network device 104 is predicted by comparing the quantity of network links for the provisioned network device 104 to the bucketing factor. If the quantity of network links for the provisioned network device 104 is less than the bucketing factor, then the role of the provisioned network device 104 is predicted as a lower-tier switch. In the example of FIG. 2, the leaf switches 104L are lower-tier switches. However, if the quantity of network links for the provisioned network device 104 is greater than or equal to the bucketing factor, then the role of the provisioned network device 104 is predicted as an upper-tier switch. In the example of FIG. 2, the spine switches 104S are upper-tier switches. The recommended persona is then selected based on the predicted role of the provisioned network device 104. For example, if the provisioned network device 104 is predicted to be a leaf switch 104L, then a leaf switch persona is recommended. Similarly, if the provisioned network device 104 is predicted to be a spine switch 104S, then a spine switch persona is recommended. The recommended persona may be displayed to a network administrator, such as via the management interface 128.

Continuing the previous example where the bucketing factor is 4.232, if the provisioned network device 104 has two network links, then the provisioned network device 104 is predicted to be a leaf switch 104L (since two is less than 4.232). Thus, a recommendation of a leaf switch persona for the provisioned network device 104 may be displayed to the network administrator via the management interface 128. However, if the provisioned network device 104 has ten network links, then the provisioned network device 104 is predicted to be a spine switch 104S (since ten is greater than or equal to 4.232). Thus, a recommendation of a spine switch persona for the provisioned network device 104 may be displayed to the network administrator via the management interface 128.

In step 308, the management service 120 assigns the recommended persona to the provisioned network device 104 in response to the network administrator agreeing with the recommendation. An input command may be received from the network administrator via the management interface 128. The input command may include an agreement or disagreement with the persona recommendation. In response to the input command including an agreement, the recommended persona is assigned to the provisioned network device 104, such as by recording the assignment in the memory of the management service 120.

In step 310, the management service 120 applies a network device configuration to the provisioned network device 104 based on the persona assigned to the provisioned network device 104. For example, if a spine switch persona was assigned to the provisioned network device 104, then a spine switch configuration is applied to the provisioned network device 104. Similarly, if a leaf switch persona was assigned to the provisioned network device 104, then a leaf switch configuration is applied to the provisioned network device 104. The management service 120 may apply the network device configuration to the provisioned network device 104 by pushing the network device configuration to the provisioned network device 104. When the network device configuration includes hardware settings, pushing the network device configuration to the provisioned network device 104 includes programming the provisioned network device 104 with the hardware settings of the network device configuration.

In step 312, the management service 120 creates a virtual network 110 on the on the physical network 102. The virtual network 110 may include a virtual tunnel 112 carrying encapsulated traffic, which is transmitted via network devices 104 including the provisioned network device 104. Creating the virtual network 110 may include configuring the encapsulation of traffic for the virtual network 110. Thus, the cloud components 114 may communicate via the provisioned network device 104.

Figure 4:
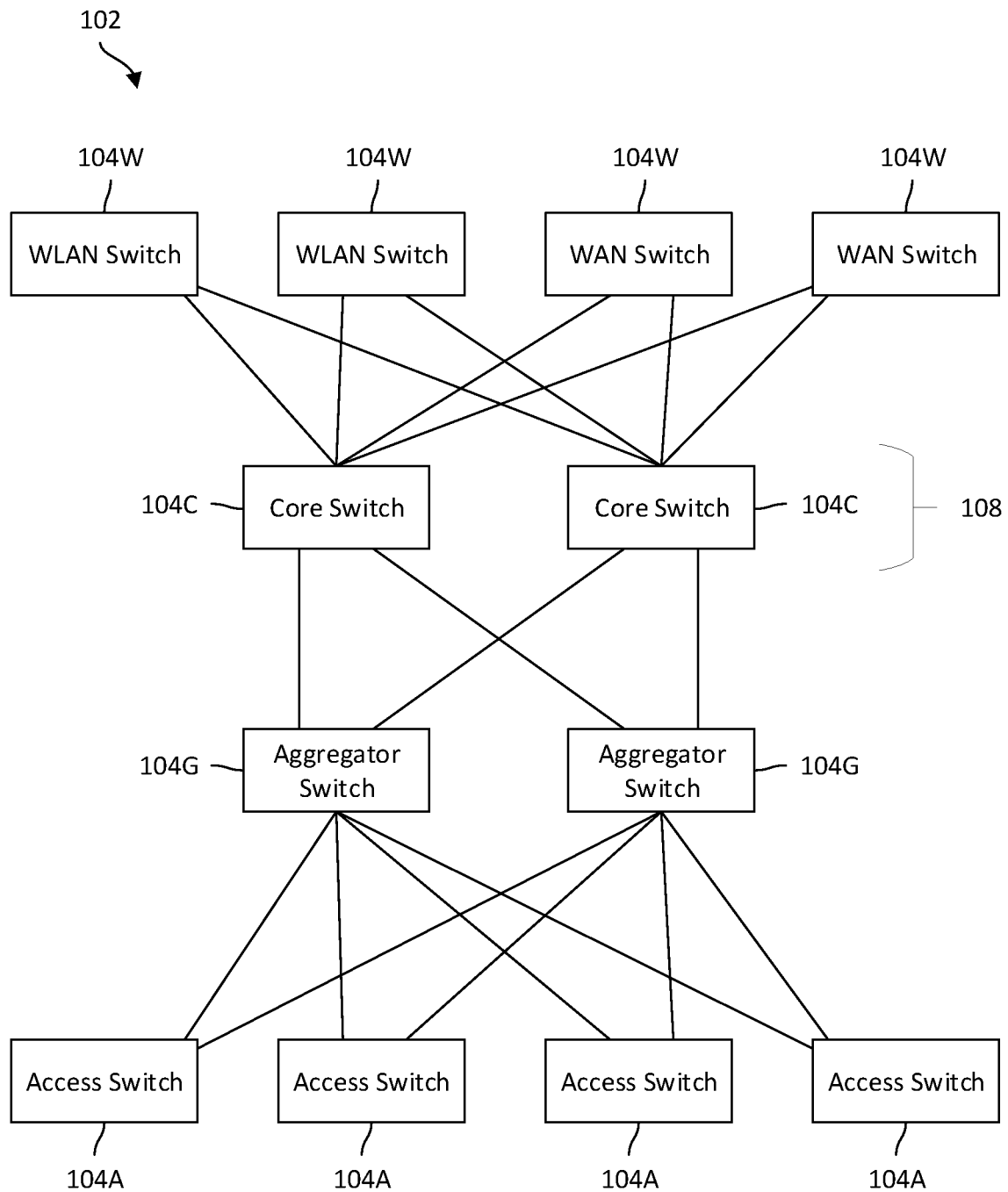
FIG. 4 is a block diagram of a physical network, according to some other implementations.

FIG. 4 is a block diagram of a physical network 102, according to some other implementations. Some features of the physical network 102 are omitted for illustration clarity. Specifically, only some of the network devices 104 of the physical network 102 (e.g., switches) as well as external WAN/WLAN switches 104W are illustrated. In this implementation, the physical network 102 has a campus network topology with a layered architecture, where the network devices 104 include access switches 104A, aggregator switches 104G, and core switches 104C.

The access switches 104A are lower-tier switches, being closer to the edge of the physical network 102 than the aggregator switches 104G and the core switches 104C. The access switches 104A contain access ports that connect to servers, firewalls, load balancers, and edge routers within the physical network 102. For example, the host servers 106 (see FIG. 1) are connected to the access switches 104A. Each access switch 104A has network links to the aggregator switches 104G.

The aggregator switches 104G and the core switches 104C are upper-tier switches, being further from the edge of the physical network 102 than the access switches 104A. The aggregator switches 104G and the core switches 104C connect the access switches 104A together, forming a layered fabric. Thus, the aggregator switches 104G and the core switches 104C act as the backbone of the physical network 102. The core switches 104C are at a border 108 of the physical network 102 and provide Layer 2 or Layer 3 external connectivity to external networks outside of the physical network 102. The core switches 104C may perform routing to external routers of the external networks, e.g., WAN/WLAN switches 104W. Each aggregator switch 104G has a network link to each of the access switches 104A. Additionally, the core switches 104C are further from the edge of the physical network 102 than the aggregator switches 104G. Each core switch 104C has a network link to each of the aggregator switches 104G. Thus, in the layered fabric, the access switches 104A are bottom-tier switches, the aggregator switches 104G are middle-tier switches and the core switches 104C are top-tier switches.

The access switches 104A may be the same hardware as the aggregator switches 104G and the core switches 104C, but the access switches 104A may be programmed differently than the aggregator switches 104G and the core switches 104C. Additionally, the aggregator switches 104G may be programmed differently than the core switches 104C. Because they have different roles in the physical network 102, the access switches 104A, the aggregator switches 104G, and/or the core switches 104C are programmed with different network device configurations. Specifically, the access switches 104A are each programmed with a lower-tier network device configuration that allows them to act as lower-tier switches. Additionally, the aggregator switches 104G and/or the core switches 104C are each programmed with upper-tier network device configuration(s) that allow them to act as upper-tier switches. The network device configuration for the access switches 104A is different than the network device configuration(s) for the aggregator switches 104G and/or the core switches 104C, in that the network device configuration for the access switches 104A includes different hardware settings (e.g., port settings, LAG settings, and/or OSPF settings) than the network device configuration(s) for the aggregator switches 104G and/or the core switches 104C. In some implementations, the access switches 104A are programmed with a bottom-tier device configuration, the aggregator switches 104G are programmed with a middle-tier device configuration, and the core switches 104C are programmed with a top-tier device configuration.

A network device 104 may be provisioned for a physical network 102 with a layered architecture using the device provisioning method 300 (described for FIG. 3). For example, when a network administrator is provisioning a switch (via the management service 120), the management service 120 will predict the role of the switch in the physical network 102, and based on that prediction, automatically recommend a persona for assignment to the switch. In this example, the management service 120 predicts whether a provisioned switch will act as an access switch 104A or as one of an aggregator switch 104G or a core switch 104C, and then recommends an access switch persona or an aggregator/core switch persona to the network administrator based on that prediction. The device provisioning method 300 may not distinguish between an aggregator switch 104G and a core switch 104C during bucketization of the provisioned network device 104. Additionally, the device provisioning method 300 may not distinguish between an access switch 104A and a WAN/WLAN switch 104W.

In the example of FIG. 4, there are four access switches 104A, two aggregator switches 104G, two core switches 104C, and four WAN/WLAN switches 104W. Each access switch 104A has two network links (e.g., to each of the aggregator switches 104G). Each aggregator switch 104G has six network links (e.g., to each of the access switches 104A and the core switches 104C). Each core switch 104C has six network links (e.g., to each of the aggregator switches 104G and the WAN/WLAN switches 104W). Each WAN/WLAN switch 104W has two network links (e.g., to each of the core switches 104C). Thus, the physical network 102 includes four network devices 104 with six network links and eight network devices 104 with two network links. In this example, the mean of the network links is 40/12 or 3.333, and the confidence interval value is $1.97/\sqrt{12}$ or about 0.569. Accordingly, the bucketing factor $f_B$ is 3.333+0.569 or about 3.902. If the provisioned network device 104 has two network links, then the provisioned network device 104 is predicted to be an access switch 104A (since two is less than 3.902). Thus, a recommendation of an access switch persona for the provisioned network device 104 may be displayed to the network administrator via the management interface 128. However, if the provisioned network device 104 has six network links, then the provisioned network device 104 is predicted to be an aggregator switch 104G/core switch 104C (since six is greater than or equal to 3.902). Thus, a recommendation of an aggregator/core switch persona for the provisioned network device 104 may be displayed to the network administrator via the management interface 128.

In this example, the device provisioning method 300 does not distinguish between an aggregator switch 104G and a core switch 104C during bucketization of the network device 104. Thus, if the provisioned network device 104 is predicted as a lower-tier switch (e.g., an access switch 104A), then an access switch persona is recommended. However, if the provisioned network device 104 is predicted as an upper-tier switch (e.g., an aggregator switch 104G or a core switch 104C), then either of an aggregator switch persona or a core switch persona may be recommended. Any suitable tiering technique may be performed to determine whether the upper-tier switch is an aggregator switch 104G or a core switch 104C. For example, similar steps as those previously described for FIG. 3 may be performed to evaluate only the upper-tier switches of the physical network 102. Specifically, a tiering factor may be computed for the upper-tier switches of the physical network 102 using statistical analysis of the quantity of network links for the upper-tier switches, in a similar manner to how the bucketing factor was computed. The quantity of network links of the provisioned network device 104 may then be compared to the tiering factor to predict whether the provisioned network device 104 is an aggregator switch 104G or a core switch 104C.

Figure 5:
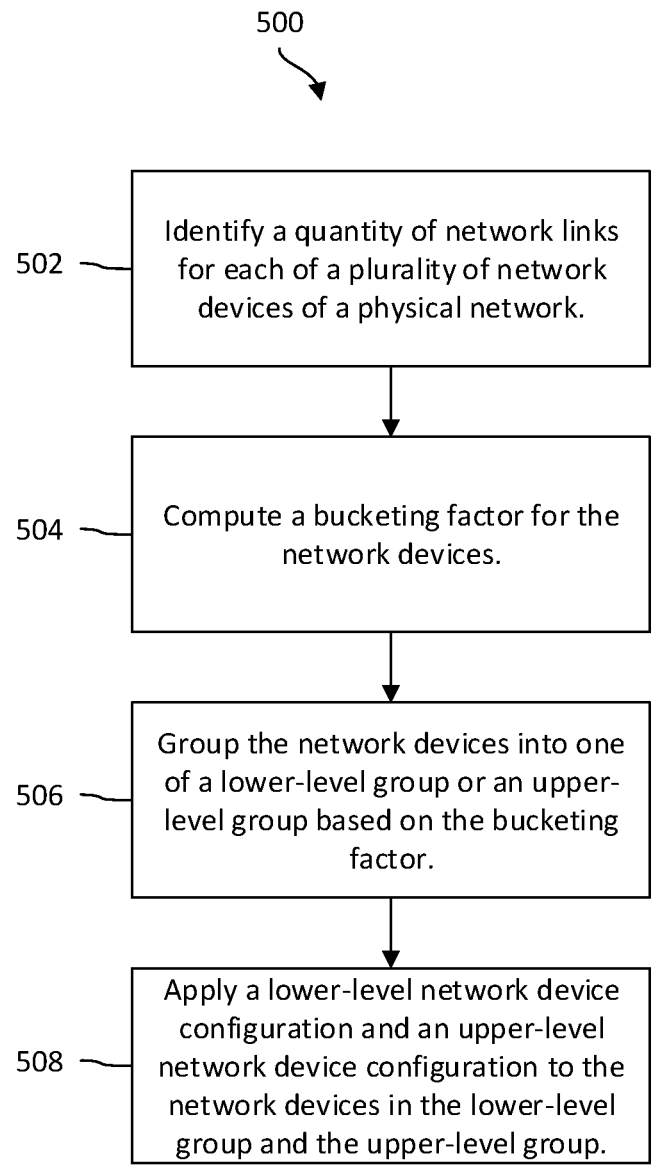
FIG. 5 is a diagram of a network device orchestration method, according to some implementations.

FIG. 5 is a diagram of a network device orchestration method 500, according to some implementations. The network device orchestration method 500 will be described in conjunction with FIGS. 1-4. The network device orchestration method 500 may be performed by the management service 120 during the orchestration of multiple network devices 104, such as switches.

In step 502, the management service 120 identifies a quantity of network links for each of a plurality of network devices 104 of a physical network 102. The quantity of network links may be discovered in a similar manner as previously described for step 302 of the network device provisioning method 300.

In step 504, the management service 120 computes a bucketing factor for the network devices 104. The bucketing factor equals the sum of a mean and a confidence interval value for the quantity of network links for the network devices 104. The bucketing factor may be calculated in a similar manner as previously described for step 304 of the network device provisioning method 300.

In step 506, the management service 120 groups the network devices 104 into one of a lower-tier group or an upper-tier group based on the bucketing factor. The quantity of network links for the network devices 104 in the lower-tier group is less than the bucketing factor. The quantity of network links for the network devices 104 in the upper-tier group is greater than or equal to the bucketing factor. Bucketizing the network devices 104 functions to predict the role of the network devices 104, where the network devices 104 in the lower-tier group are predicted to have a lower-tier role (e.g., leaf switches or access switches) and the network devices 104 in the upper-tier group are predicted to have an upper-tier role (e.g., spine switches or aggregator/core switches).

A lower-tier persona is then recommended for the network devices 104 in the lower-tier group, while an upper-tier persona is recommended for the network devices 104 in the upper-tier group. For example, in a data center network topology, a spine switch persona may be recommended for the network devices in the upper-tier group, while a leaf switch persona may be recommended for the network devices in the lower-tier group. Likewise, in a campus network topology, an aggregator/core switch persona may be recommended for the network devices in the upper-tier group, while an access switch persona may be recommended for the network devices in the lower-tier group. The recommendations are displayed, such as to a network administrator.

In step 508, the management service 120 applies a lower-tier network device configuration and an upper-tier network device configuration to the network devices 104 in, respectively, the lower-tier group and the upper-tier group. For example, in a data center network topology, a leaf switch configuration may be applied to the network devices 104 in the lower-tier group while a spine switch configuration may be applied to the network devices 104 in the upper-tier group. Likewise, in a campus network topology, an access switch configuration may be applied to the network devices 104 in the lower-tier group while an aggregator/core switch configuration may be applied to the network devices 104 in the upper-tier group. The assignment of the network device configurations may be performed in response to receiving agreement, by the network administrator, with the persona recommendations. Additional steps may optionally be performed. For example, after applying the lower-tier network device configuration and the upper-tier network device configuration, the management service 120 may create a virtual network 110 on the physical network 102.

In an example implementation consistent with the features disclosed herein, a system includes: a plurality of network devices; and a management service implemented on a computer configured to: identify a quantity of network links for each of the network devices; compute a bucketing factor for the network devices, the bucketing factor equaling a sum of a mean and a confidence interval value for the quantity of network links for the network devices; recommend a persona for a provisioned network device based on the bucketing factor; assign the persona to the provisioned network device; and apply a network device configuration to the provisioned network device based on the persona assigned to the provisioned network device.

In another example implementation of the system, the management service is configured to recommend the persona for the provisioned network device by predicting a role of the provisioned network device. In another example implementation of the system, the management service is configured to predict the role of the provisioned network device by comparing a quantity of network links for the provisioned network device to the bucketing factor, the role being an upper-tier switch when the quantity of network links for the provisioned network device is greater than or equal to the bucketing factor, the role being a lower-tier switch when the quantity of network links for the provisioned network device is less than the bucketing factor.

In another example implementation of the system, the network devices are part of a physical network, and the management service is further configured to: create a virtual network on the physical network. In another example implementation of the system, the physical network has a spine-leaf architecture. In another example implementation of the system, the physical network has a layered architecture. In another example implementation of the system, the management service and the network devices are part of a same physical network.

In another example implementation of the system, the management service and the network devices are part of different physical networks. In another example implementation of the system, the management service is configured to identify the quantity of network links for each of the network devices via Link Layer Discovery Protocol.

In an example implementation consistent with the features disclosed herein, a computer-implemented method includes: identifying a quantity of network links for each of a plurality of network devices of a physical network; computing a bucketing factor for the network devices, the bucketing factor equaling a sum of a mean and a confidence interval value for the quantity of network links for the network devices; grouping the network devices into one of a lower-tier group or an upper-tier group based on the bucketing factor, the quantity of network links for the network devices in the lower-tier group being less than the bucketing factor, the quantity of network links for the network devices in the upper-tier group being greater than or equal to the bucketing factor; and applying a lower-tier network device configuration and an upper-tier network device configuration to the network devices in, respectively, the lower-tier group and the upper-tier group.

In another example implementation, the method further includes: after applying the lower-tier network device configuration and the upper-tier network device configuration, creating a virtual network on the physical network. In another example implementation of the method, the lower-tier network device configuration is a leaf switch configuration and the upper-tier network device configuration is a spine switch configuration. In another example implementation of the method, the lower-tier network device configuration is an access switch configuration and the upper-tier network device configuration is an aggregator/core switch configuration.

In another example implementation, the method further includes: recommending a lower-tier persona and an upper-tier persona for the network devices in, respectively, the lower-tier group and the upper-tier group; and receiving an agreement with the lower-tier persona and the upper-tier persona, where the lower-tier network device configuration and the upper-tier network device configuration are applied in response to receiving the agreement with the lower-tier persona and the upper-tier persona.

In another example implementation of the method, identifying the quantity of network links includes discovering the quantity of network links for each of the network devices via a network discovery protocol. In another example implementation of the method, the network discovery protocol is Link Layer Discovery Protocol.

In an example implementation consistent with the features disclosed herein, a non-transitory computer readable medium stores instructions which, when executed by a processor, cause the processor to: identify a quantity of network links for each of a plurality of network devices of a physical network; compute a bucketing factor for the network devices, the bucketing factor equaling a sum of a mean and a confidence interval value for the quantity of network links for the network devices; recommend a persona for a provisioned network device by comparing a quantity of network links for the provisioned network device to the bucketing factor; assign the persona to the provisioned network device; apply a network device configuration to the provisioned network device based on the persona assigned to the provisioned network device; and create a virtual network on the physical network.

In another example implementation of the non-transitory computer readable medium, the instructions to apply the network device configuration to the provisioned network device are performed in response to a network administrator agreeing with the persona that is recommend. In another example implementation of the non-transitory computer readable medium, the quantity of network links for each of the network devices are identified via Link Layer Discovery Protocol. In another example implementation of the non-transitory computer readable medium, the virtual network transports encapsulated network traffic over the physical network.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A system comprising:
a plurality of network devices; and
a management service implemented on a computer configured to:
identify a quantity of network links for each of the network devices;
compute a bucketing factor for the network devices, the bucketing factor equaling a sum of a mean and a confidence interval value for the quantity of network links for the network devices;
recommend a persona for a provisioned network device based on the bucketing factor;
assign the persona to the provisioned network device; and
apply a network device configuration to the provisioned network device based on the persona assigned to the provisioned network device.

2. The system of claim 1, wherein the management service is configured to recommend the persona for the provisioned network device by predicting a role of the provisioned network device.

3. The system of claim 2, wherein the management service is configured to predict the role of the provisioned network device by comparing a quantity of network links for the provisioned network device to the bucketing factor, the role being an upper-tier switch when the quantity of network links for the provisioned network device is greater than or equal to the bucketing factor, the role being a lower-tier switch when the quantity of network links for the provisioned network device is less than the bucketing factor.

4. The system of claim 1, wherein the network devices are part of a physical network, and the management service is further configured to:
   create a virtual network on the physical network.

5. The system of claim 4, wherein the physical network has a spine-leaf architecture.

6. The system of claim 4, wherein the physical network has a layered architecture.

7. The system of claim 1, wherein the management service and the network devices are part of a same physical network.

8. The system of claim 1, wherein the management service and the network devices are part of different physical networks.

9. The system of claim 1, wherein the management service is configured to identify the quantity of network links for each of the network devices via Link Layer Discovery Protocol.

10. A computer-implemented method comprising:
   identifying a quantity of network links for each of a plurality of network devices of a physical network;
   computing a bucketing factor for the network devices, the bucketing factor equaling a sum of a mean and a confidence interval value for the quantity of network links for the network devices;
   grouping the network devices into one of a lower-tier group or an upper-tier group based on the bucketing factor, the quantity of network links for the network devices in the lower-tier group being less than the bucketing factor, the quantity of network links for the network devices in the upper-tier group being greater than or equal to the bucketing factor; and
   applying a lower-tier network device configuration and an upper-tier network device configuration to the network devices in, respectively, the lower-tier group and the upper-tier group.

11. The method of claim 10, further comprising:
   after applying the lower-tier network device configuration and the upper-tier network device configuration, creating a virtual network on the physical network.

12. The method of claim 10, wherein the lower-tier network device configuration is a leaf switch configuration and the upper-tier network device configuration is a spine switch configuration.

13. The method of claim 10, wherein the lower-tier network device configuration is an access switch configuration and the upper-tier network device configuration is an aggregator/core switch configuration.

14. The method of claim 10, further comprising:
   recommending a lower-tier persona and an upper-tier persona for the network devices in, respectively, the lower-tier group and the upper-tier group; and
   receiving an agreement with the lower-tier persona and the upper-tier persona, wherein the lower-tier network device configuration and the upper-tier network device configuration are applied in response to receiving the agreement with the lower-tier persona and the upper-tier persona.

15. The method of claim 10, wherein identifying the quantity of network links comprises discovering the quantity of network links for each of the network devices via a network discovery protocol.

16. The method of claim 15, wherein the network discovery protocol is Link Layer Discovery Protocol.

17. A non-transitory computer readable medium storing instructions which, when executed by a processor, cause the processor to:
   identify a quantity of network links for each of a plurality of network devices of a physical network;
   compute a bucketing factor for the network devices, the bucketing factor equaling a sum of a mean and a confidence interval value for the quantity of network links for the network devices;
   recommend a persona for a provisioned network device by comparing a quantity of network links for the provisioned network device to the bucketing factor;
   assign the persona to the provisioned network device;
   apply a network device configuration to the provisioned network device based on the persona assigned to the provisioned network device; and
   create a virtual network on the physical network.

18. The non-transitory computer readable medium of claim 17, wherein the instructions to apply the network device configuration to the provisioned network device are performed in response to a network administrator agreeing with the persona that is recommend.

19. The non-transitory computer readable medium of claim 17, wherein the quantity of network links for each of the network devices are identified via Link Layer Discovery Protocol.

20. The non-transitory computer readable medium of claim 17, wherein the virtual network transports encapsulated network traffic over the physical network.

* * * * *